US008532673B2

(12) United States Patent
Walker et al.

(10) Patent No.: US 8,532,673 B2
(45) Date of Patent: Sep. 10, 2013

(54) METHOD AND APPARATUS FOR INTER NETWORK RETRIEVAL OF USER RELATED DATA

(75) Inventors: John Michael Walker, The Hague (NL); Jorge Hernandez Vazquez, Griñón (ES); Zdravko Jukic, Zagreb (HR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 604 days.

(21) Appl. No.: 12/520,378

(22) PCT Filed: Dec. 17, 2007
(Under 37 CFR 1.47)

(86) PCT No.: PCT/SE2007/051018
§ 371 (c)(1),
(2), (4) Date: Apr. 20, 2010

(87) PCT Pub. No.: WO2008/076068
PCT Pub. Date: Jun. 26, 2008

(65) Prior Publication Data
US 2012/0238292 A1    Sep. 20, 2012

(30) Foreign Application Priority Data
Dec. 19, 2006   (EP) ..................................... 06126541

(51) Int. Cl.
*H04W 24/00* (2009.01)
(52) U.S. Cl.
USPC ................. 455/456.2; 455/432.1; 455/432.2; 455/432.3; 455/433; 455/435.1; 455/435.2; 455/436; 455/444; 455/456.1; 455/553.1; 370/310.2; 370/328; 370/331; 370/338

(58) Field of Classification Search
USPC ............. 455/432.1, 432.2, 432.3, 433, 435.1, 455/436–444, 552.1, 553.1, 456.1–457, 435.2; 370/310.2, 328, 331, 338
See application file for complete search history.

(56) References Cited

U.S. PATENT DOCUMENTS

| 7,916,685 B2* | 3/2011 | Schaedler et al. ............ 370/328 |
| 2006/0003766 A1 | 1/2006 | Parameswar et al. | |

FOREIGN PATENT DOCUMENTS

| EP | 1 551 144 A1 | 7/2005 |
| EP | 1 648 190 A1 | 4/2006 |

(Continued)

OTHER PUBLICATIONS

Bartlolmeo, G. et al. Handling user Profiles for the Secure and Convenient Configuration and Management of Mobile Terminals and Services, IEEE XP10835605. Aug. 22, 2005.
3GPP.Technical Specification 3rd Generation Partnership Project: Technical Specification Group Services and System Aspect; Service requirement for the 3GPP Generic User Profile (GUP); Stage 1, (Release 6). 3GPP TS 22.240 V.6 5.0 (Jan. 2005).

*Primary Examiner* — Steve D Agosta (57) ABSTRACT

Data related to a subscriber in a communications network is to be retrieved. A first Generic User Profile (GUP) server receives an incoming request for the subscriber related data from a data consumer in a first communication domain and determines that the data is located in a second communication domain. An outgoing request for the data is then transmitted to a second GUP server in the second communication domain via an interface. The second GUP server then retrieves the requested subscriber related data from a network repository and transmits the requested data to the first GUP server, which forwards the requested data to the data consumer. Service access to subscriber data located in other domains than the GUP Server is enabled, for example when the subscriber is roaming. The subscriber related data can also be distributed in both the first and second communication domain.

15 Claims, 11 Drawing Sheets

(56) References Cited

FOREIGN PATENT DOCUMENTS

| RU | 2271076 C2 | 2/2006 |
| WO | WO 98/39944 A2 | 9/1998 |
| WO | WO 2006/066145 A1 | 6/2006 |

* cited by examiner

METHOD AND APPARATUS FOR INTER NETWORK RETRIEVAL OF USER RELATED DATA

FIELD OF INVENTION

The present invention relates to handling subscriber related data in a communications network and more particularly to a method and apparatus for inter-network retrieval of data related to a subscriber.

BACKGROUND

The objective of specifying the 3GPP Generic User Profile (GUP) is to provide a means to enable harmonized usage of the user-related information originating from different entities.

The 3GPP Generic User Profile is the collection of User-related data which affects the way in which an individual user experiences services where a community of entities shares these data. The 3GPP Generic User Profile can be stored in the home network environment and/or Value Added Service Provider equipment.

Within a GUP scenario the following roles exist: 3GPP GUP Servers are deployed by Operators, end-users have one GUP Server associated to its profile and Data Consumers (i.e., applications) needing to handle/consume end-user's profiles contact 3GPP GUP Servers.

3GPP GUP defines two interfaces, namely Rg and Rp, where the first one is the one to be used by Data Consumers (i.e., applications) while the second one is an intra-operator interface which is to be used by GUP Servers towards Data Repositories. Both interfaces are based on Liberty Alliance DST protocol; see "Liberty ID-WSF Data Services Template Specification", Liberty Alliance Project, http://www-.projectliberty.org/spes/liberty-idwsf-dst-v2.0.pdf.

Information to be handled by 3GPP GUP Servers (logical data model) is currently not specified except a minor portion with regards to IMS data within HSS node.

Potentially any end-user's data (static and dynamic) which might be of interest to data consumers could be decided, by operators, to be made available through 3GPP GUP Servers.

The 3GPP Generic User Profile (GUP) is further described in 3GPP TS 22.240 v6.5.0, "Service requirement for the 3GPP Generic User Profile (GUP); Stage 1 (Release 6)" http://www.3gpp.org/ftp/Specs/html-info/22240.htm.

The GUP will help overcome some of the challenges associated with the introduction of sophisticated user terminals with widely varying capabilities, hybrid combinations of mobile network domains, the advent of downloadable applications, and the desire of users to customize potentially complex services to individual preferences and needs.

A GUP component instance is a physical representation of a GUP component. Component instances may be located in the Home Network, in the Value Added Service Provider Environment and/or the User Equipment.

The 3GPP Generic User Profile allows intra-network usage (i.e. data exchange between applications within a mobile operator's network) and inter-network usage (between mobile operator's network and value added service providers. Mobile Virtual Operators MVNO:s and visited networks are treated as value added service providers in terms of GUP data exchanges with mobile operator's network.

For each user one User Profile exists, which may consist of several 'components'. These components may be distributed in the home network and value added service provider's environment. The 3GPP GUP data are distributed by nature and consequently stored in home network and Value Added Service Provider Equipment.

A problem is that the 3GPP GUP data is potentially distributed in those cases where an end-user is a subscriber to or roaming in a different network. In this situation a GUP Server can only provide static and dynamic data which is stored in its own network.

In a roaming scenario data consumers (applications) located in the Home-PLMN (HPLMN hereafter), and willing to consume dynamic data of the roamed end-user, will always contact the GUP server that holds the data for that end-user. In this scenario it happens that some portions of the end-user profile can only be retrieved by contacting the Visited-PLMN (VPLMN hereafter). In such case Data consumers (applications) might query the GUP Server in the HPLMN (i.e., the one which the application has established a commercial relationship with) for this data but the GUP Server is not allowed to query data repositories (e.g. VLR or SGSN in VPLMN) in a different network (Rp, an intra-operator interface requires high levels of trust).

Thus, there exist no solutions on how to access user profile related data residing in another domain than the GUP Server of the data consumer, in a secure and efficient way.

SUMMARY OF INVENTION

The present invention relates to the problem of providing an improved apparatus and method for retrieving subscriber related data in a communications network avoiding the above mentioned drawbacks of lacking solutions on how to access user profile related data residing in another domain than the GUP Server of a data consumer, in a secure and efficient way.

This problem is solved by a method and apparatus for retrieving data related to the subscriber in the communications network wherein a first GUP server is receiving an incoming request for subscriber related data from a data consumer in a first communication domain and determining that at least a part of the data is located in a second communication domain. An outgoing request for the at least part of the data is then transmitted to a second GUP server in the second communication domain. The second GUP server then retrieves the requested subscriber related data from at least one network repository and transmits a response with the requested data to the first GUP server. The first GUP server receives the response from the second GUP server containing the requested at least part of the data and forwards the requested data to the data consumer.

The purpose with the invention is to enable service access to subscriber data located in other domains than that of the GUP Server associated with the data consumer, for example when roaming.

It is an advantage of the invention that it is possible to retrieve parts of the user profile of a roamed end-user in those cases in which relevant portions of such profile are distributed in the home domain, i.e. the first communication domain, and in the visited domain, i.e. the second communication domain.

It is also an advantage that it is possible to retrieve parts of the user profile of an end-user in those cases in which relevant portions of such profile are distributed in the home domain and in the visited domain of an end-user not being a subscriber to the communication domain of the GUP of the data consumer.

It is another advantage of the invention that it enables exchange of information between GUP servers providing the relevant trust mechanisms required for such communication.

The invention reuses existing roaming inter-connection agreements between both home and visited domains (i.e., operators) and eliminates the need for data consumers for establishing commercial relationships with multiple GUP user-data providers (i.e., operators with a GUP server infrastructure).

In one embodiment the transmitting of the outgoing request to, and receiving the response from, the second GUP server occurs over a GUP Server interworking interface.

This has the advantage of providing a simpler GUP server which does not have to keep track of state of requests.

Preferred embodiments of the invention will now be described in more detail with reference to the enclosed drawings.

DETAILED DESCRIPTION OF THE INVENTION

Figure 1A:
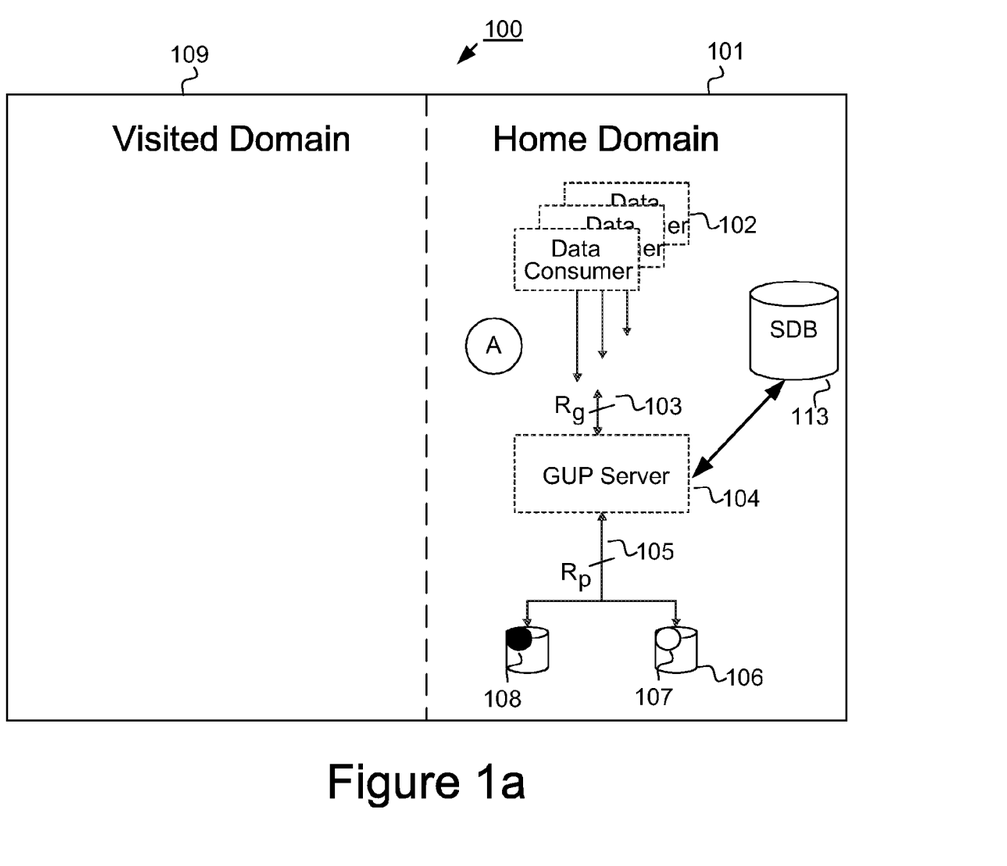
FIG. 1a is a block diagram showing a GUP reference architecture according to prior art.

FIG. 1a is a block diagram showing a GUP reference architecture. A communications network 100 includes at least a home domain 101 and a visited domain 109.

A Home GUP Server HGUP 104 is the native GUP Server of an end-user A located in the home domain of such user. This HGUP is the one deployed by the domain operator the end-user has established a commercial relationship with.

Data consumers 102 in the home domain are operationally connected to the HGUP over an external interface Rg 103.

The GUP Server is a functional entity providing a single point of access to the Generic User Profile data of a particular subscriber. Such data are located in Network Repositories 106 and can be both static data 107 and dynamic data 108. GUP servers connect to data repositories within the same domain using intra-operator interfaces Rp 105.

The HGUP 104 may obtain user data, such as location information, from a subscriber data base SDB 113, such as a Home Subscriber Server HSS, a Home Location Register HLR or a Visited Location Register VLR.

Figure 1B:
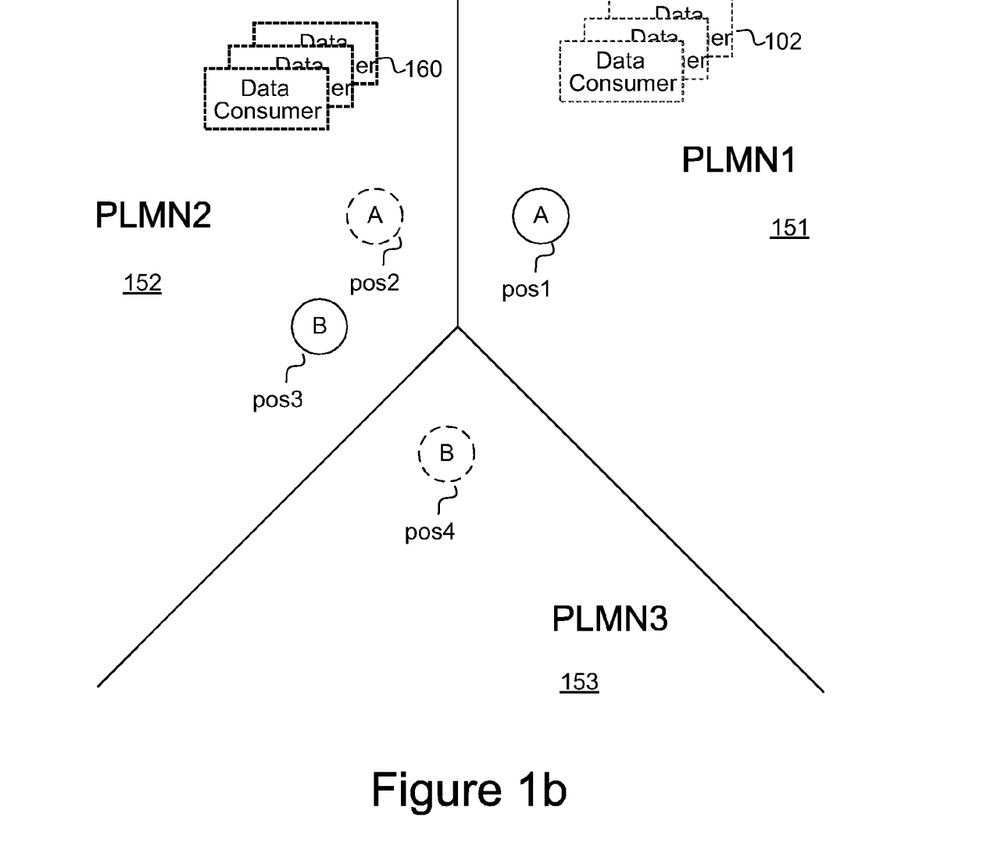
FIG. 1b is a network schema showing use cases where the invention is useful.

Referring to FIG. 1b the invention proposes the definition of new mechanisms within the 3GPP GUP architecture which enables the Data Consumer 102, for example a Value Added Service Provider, to obtain user data (static or dynamic) of a 3GPP GUP profile irrespectively of the location of the end-user. Examples of use cases with situations where user data are located outside the home domain of the GUP server are:

The first user A is located at first position pos1 in its home domain 101, which is a Public Land Mobile Network PLMN1 151 but accesses a service that needs data about a user B, where user B is a subscriber of another domain than PLMN1, e.g. PLMN2 152. The user B may be located at a third position pos3 in PLMN2, or roaming at a fourth position pos4 in PLMN3 153.

The first user A is located at a second position pos2 roaming in a visited domain 109, for example PLMN2 152 and accessing a service in its home domain 101, i.e PLMN1 151, where the service needs dynamic data from the visited PLMN2.

The first user A is located at a second position pos2 roaming in a visited PLMN2 and accesses a service from a Data Consumer 160 in the visited PLMN2 that needs static data from the home PLMN1.

Examples of such data are SGSN related data not available in the HLR but located in the visited SGSN: Routing area, Cell identity, Cell identity age, Service Area Code, MS radio access capability, MS network capability, PDP state, APN in use, GGSN address in use, QoS negotiated, Charging Id, RNC address in Use, Prohibit Payload Compression, APN restriction. Examples of GGSN related data when placed in VPLMN are APN in use, QoS negotiated and SGSN address in use. Other examples are relevant dynamic data in the visited domain (for example, negotiated QoS in the v-SGSN/GGSN, charging-id in the v-SGSN/GGSN, TMSI and PTMSI in the VLR, the end-user's contact IP/SIP address in the v-P-CSCF, etc).

Figure 1C:
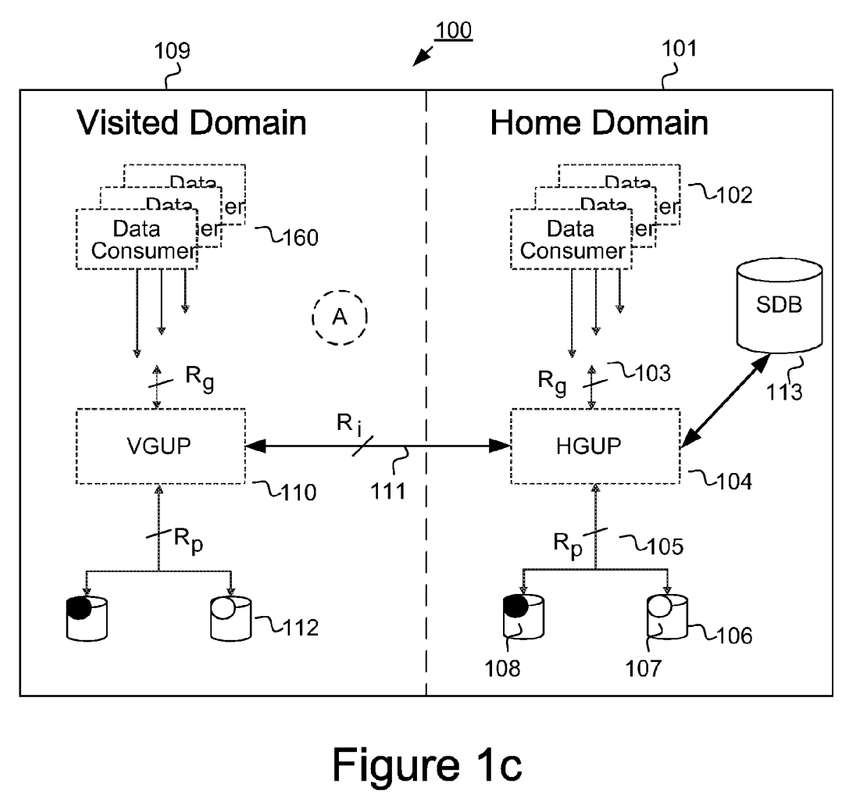
FIG. 1c is a block diagram showing a GUP reference architecture for GUP Server interworking according to the invention.

FIG. 1c is a block diagram showing GUP reference architecture for GUP Server interworking according to the invention. As shown in FIG. 1a the communications network 100 includes at least the home domain 101 and the visited domain 109. When a user is roaming the User Profile of interest for a service is distributed over the different domains 101, 109. According to the invention a Visited GUP Server VGUP 110 is a GUP Server which temporary serves HGUPs 104 on behalf of data consumers 102 (i.e., applications) willing to query dynamic data that can only be retrieved from the visited domain (i.e., operator).

An interworking interface Ri 111 is utilized to communicate with the VGUP 110 to be able to access data located in a network repository 112 in the visited domain.

A GUP Server could normally function as both HGUP and VGUP as it will behave as HGUP Server for its own subscribers-base, e.g. the data consumers 160 and as VGUP Server for users roaming into its domain.

Figure 2:
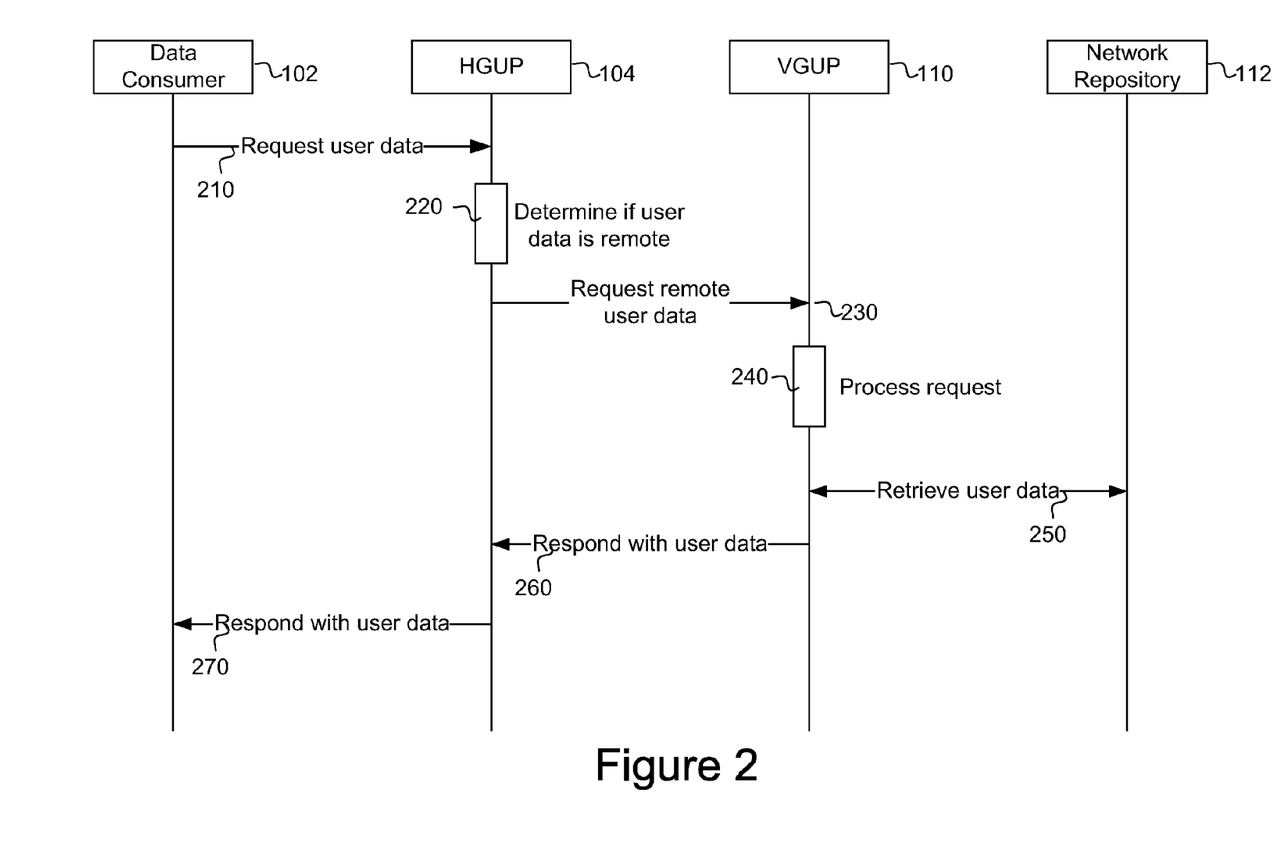
FIG. 2 is a message sequence chart showing a method according to a first embodiment of the invention.

FIG. 2 is a message sequence chart showing the method according to a first embodiment of the invention.

In step 210 a data consumer 102, i.e. an application/data requestor, is querying the HGUP 104 it has a commercial relationship with for user data. The data consumer is located in the home domain 101 and communicates using the Rg interface 103, as shown in FIG. 1c. On reception of the query the GUP server checks in step 220 if the queried user data, e.g. dynamic data such as location of the user, is located in another network for example due to an end-user roaming situation or due to that the end user whose data is being queried belongs to another network. If the user data is located in another network, the HGUP modifies the incoming query message and includes information for the reply, including network origin and reply back address, in order to forward it to the VGUP. In step 230 the message is forwarded to the VGUP currently holding such dynamic data using the Ri interface 111.

In step 240 the VGUP processes the query taking into account that the query is relevant to an end-user who, although it does not belong to the Visited domain, belongs to a network operator with a valid roaming agreement. In other words, the VGUP processes the query and does not drop it due to the fact that the user is not from its own network. The VGUP processes the query taking into account also that the response with the relevant user data shall be sent back to the HGUP acting as a proxy instead of to the originating application in the home domain, which is actually unknown to the VGUP from both a technical and commercial point of view.

In step 250 the VGUP retrieves the user data from the relevant repository using the Rp interface 105 of FIG. 1c.

In step 260 the response with the user data is sent back to the HGUP over the Ri interface 111.

In step 270 the response with the user data is sent back to the requesting data consumer over the Rg interface 103.

Figure 3:
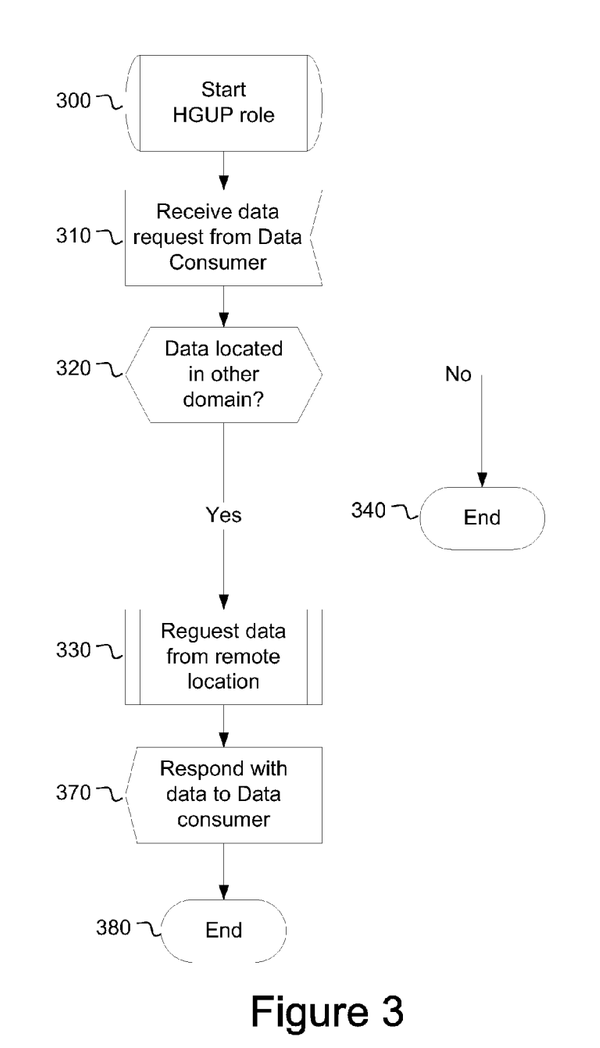
FIG. 3 is a flow chart showing an embodiment of a Home GUP Server.

FIG. 3 is a flow chart showing an embodiment of the HGUP 104. The HGUP, after being started in step 300, receives a request from a data consumer 102, i.e. an application/data requestor in step 310. On reception of the query the GUP server checks in step 320 if the queried user data, e.g. dynamic data such as location of the user, is located in another network for example due to an end-user roaming situation or due to that the end user whose data is being queried belongs to another network. The HGUP also determines the location of the user data. If not located in another network, the processing ends in step 340. If the user data is located in another network, the HGUP modifies the incoming query message in step 330 and includes information for the reply, including network origin and reply back address, in order to request the data from the VGUP. In step 370 the response with the user data is sent back to the requesting data consumer before ending in step 380.

Figure 4:
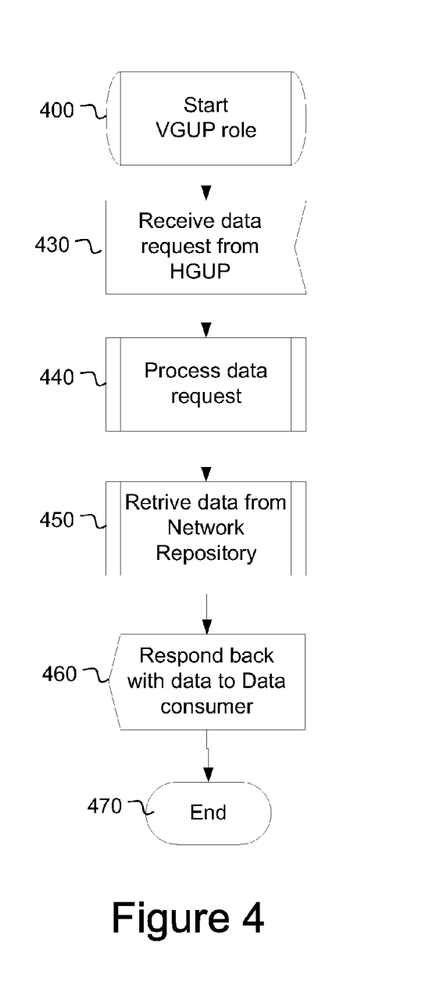
FIG. 4 is a flow chart showing an embodiment of a Visited GUP Server.

FIG. 4 is a flow chart showing an embodiment of the VGUP 110. The VGUP, after being started in step 400, receives a request from a HGUP in step 430. In step 440 the VGUP processes the data request. In step 450 the VGUP retrieves the user data from the relevant repository(s) and responds back with the user data to the HGUP in step 460 before ending in step 470.

Figure 5:
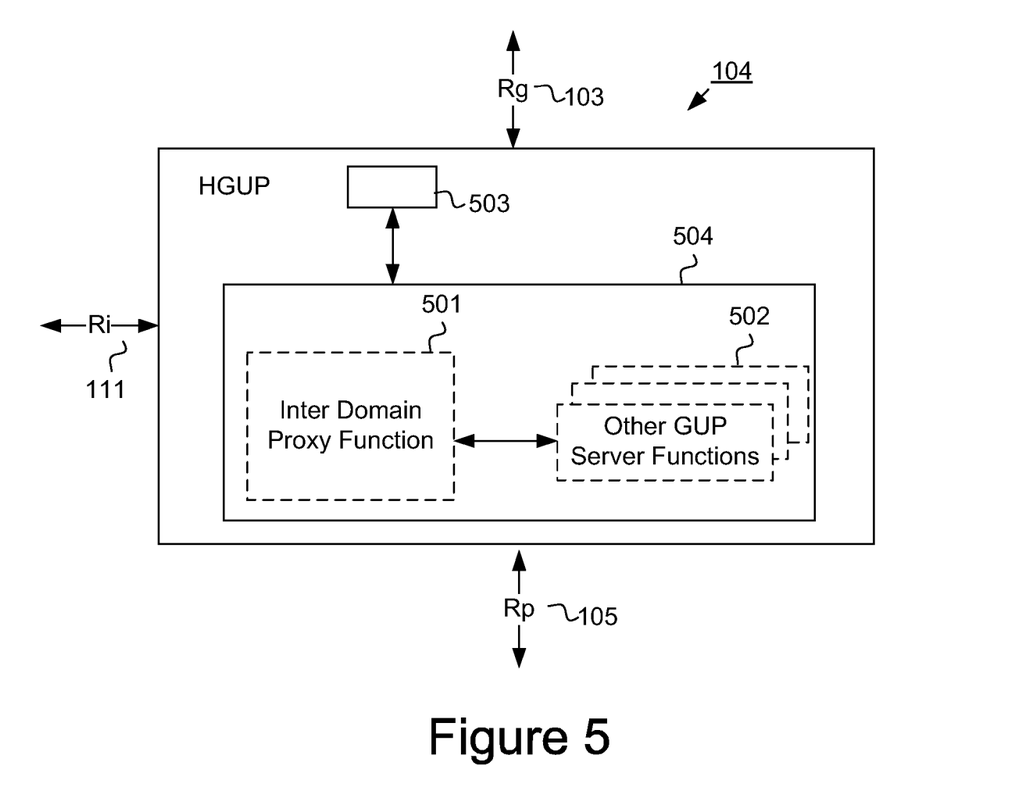
FIG. 5 is a block diagram showing a Home GUP Server according to an embodiment of the invention.

FIG. 5 shows the HGUP 104 according to one embodiment of the invention having a processor 503 and a memory 504 having instructions accessible from the memory and processable by said processor. A Inter-Domain Proxy functionality IPF 501 is function block loaded in the memory having the ability to receive data requests on data which belong to an end-user where these data are currently handled by a GUP Server in another domain than that of the HGUP, for example the visited domain 109. The memory also comprises other GUP server functions 502.

Figure 6A:
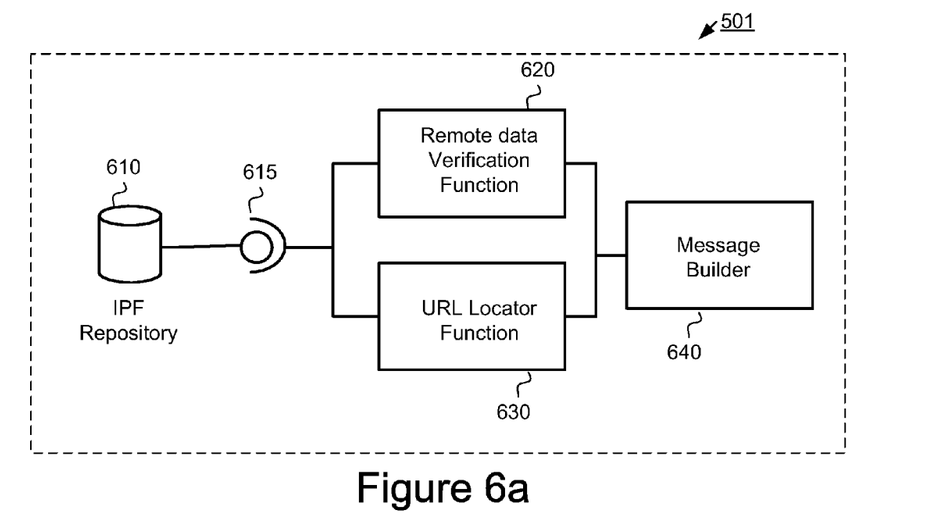
FIG. 6a is a block diagram showing an embodiment of an Inter Domain Proxy Function of the invention.

FIG. 6a is a block diagram showing the Inter Domain Proxy Function 501 of the invention having the ability to receive data requests on data which belong to an end-user of the HGUP but where these data are currently handled by a GUP Server deployed over the visited domain/network the end-user is roaming in (i.e. the VGUP).

An IPF Repository IPFR 610 is an internal component handling storage of relevant parameters. It shall handle, at least, ResourceId, PLMN-Id, DataReference and VGUP Uniform Resource Locator URL.

The IPFR is accessed via an interface 615 using for example Structured Query Language SQL or Lightweight Directory Access Protocol LDAP databases.

The IPF includes a Remote Data Verification Function RVF 620 which is a software component in charge of analyzing the requested data to determine if it can be a parameter allocated in another domain than that of the GUP Server associated with the data consumer. Examples are a visited domain for a roaming subscriber or that the requested data concerns a subscriber being a subscriber to another domain. The RVF also determines the end user subject of the query. To perform its functionality the RVF will make use of a DataReference input parameter contained in the original Rg Query message, as shown in step 710 of FIG. 7. It will also use information contained in the IPF Repository, specifically the subject of the query and the current PLMN-Id where the user is located. The subject of the query, i.e. the user identity, is for example the ResourceId according to http://www.3gpp.org/ftp/Specs/html-info/23240.htm terminology.

Introduction of these parameters in the IPFR depends on the IPF triggering mechanism in place and could require further interaction with standard GUP functionalities, for example an Rp query to SDB to get location information.

The IPF also includes an URL Locator Function ULF 630 which is a software component that looks up/maps the PLMN-Id parameter obtained from the IPFR to a valid VGUP URL, .i.e. the VGUP address. This information could as an alternative also be retrieved directly in the RVF.

The IPF further includes a Message Builder MB 640 which is a software component in charge of generating the Ri messages between both HGUP and VGUP.

As has been set out also in conjunction with FIG. 1b, a variety of scenarios exists in which user data can be distributed or located in several domains/networks.

Figure 7:
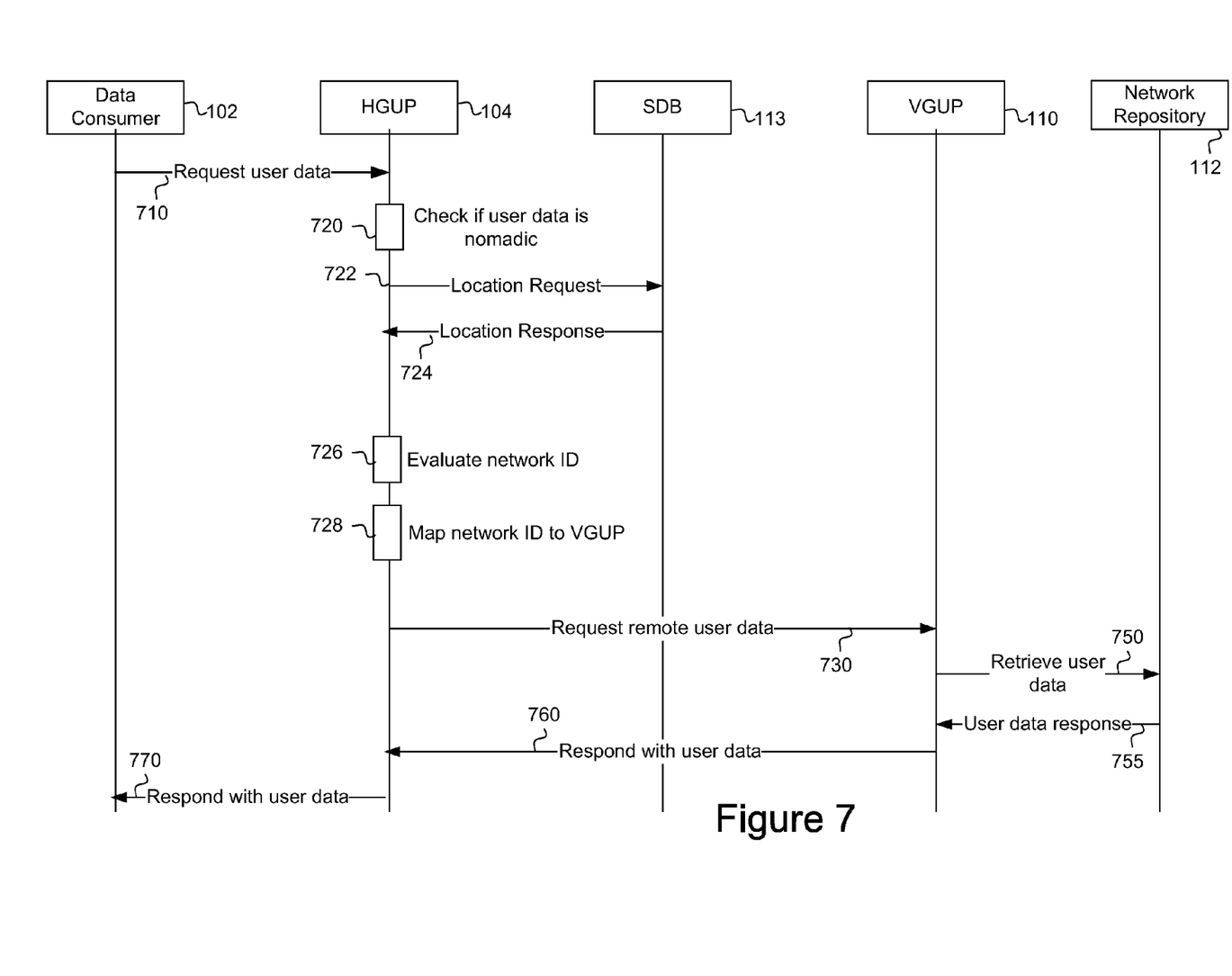
FIG. 7 is a message sequence chart showing a mechanism for IPF triggering according to one embodiment of the invention using roaming status check for relevant dynamic data.

FIG. 7 describes a mechanism for IPF triggering according to one embodiment of the invention using roaming status check for relevant dynamic data. In this embodiment, referring to FIGS. 1b and 1c, the user A is roaming at a location pos2 in the visited domain 109 here being PLMN2 152. In step 710 the HGUP 104 receives a data request from the Data Consumer 102 over the Rg interface. A check is made using the IPF 501 in step 720 whether the request is referring to dynamic data that is nomadic, i.e can be located in another network as for example the visited domain 109 in FIG. 1c. If so, the HGUP checks with the SDB 113 in step 722 using the Rp interface ReadData or Sh-Pull(LocationInformation) messages, and receives a response in step 724 with the relevant information elements. This can be e.g. Service Area ID SAI contained within the LocationInformation value stored in the SDB to know the identification of the network where the end-user is currently located.

In step 726 the response is evaluated to see whether the user is roaming and if so the PLMN-Id is mapped to a URL for the VGUP in question in step 728. In step 730 a query for user data is sent to the identified VGUP over the Ri interface 111. In step 750 the VGUP will retrieve the requested data from the Network Repository 112. In step 755 the user data is responded back to the VGUP which will process and forward it to the HGUP in step 760. In step 770 the data is further forwarded to the requesting data consumer.

Figure 6B:
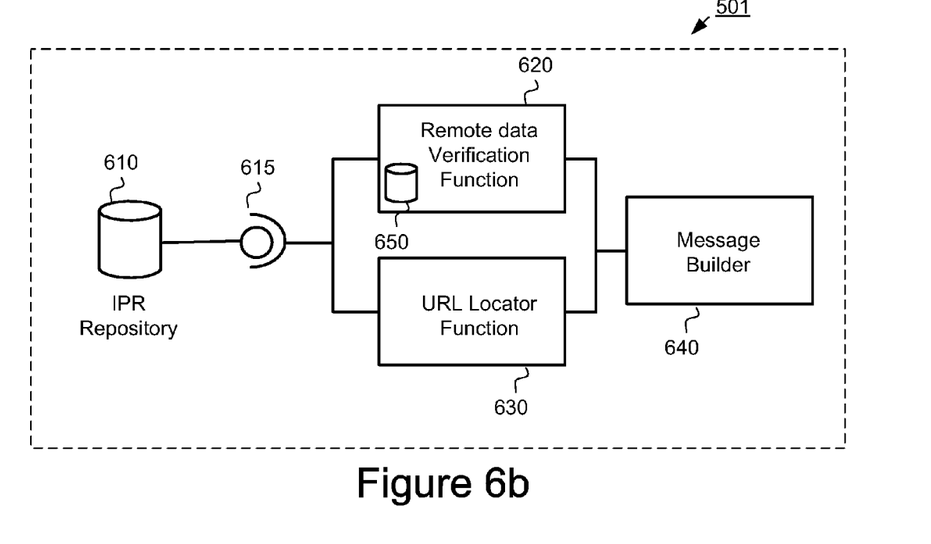
FIG. 6b is a block diagram showing an embodiment of an Inter Domain Proxy Function of the invention.

FIG. 6b is a block diagram showing an alternative embodiment of the IPF 501. This embodiment is identical to that of FIG. 6a with the difference that the RVF 620 is arranged to perform subscriptions to notifications of changes in user data location and to receive such notifications. Further, the RVF includes a Notifications Database NDB 650 arranged to store such notifications.

Figure 8:
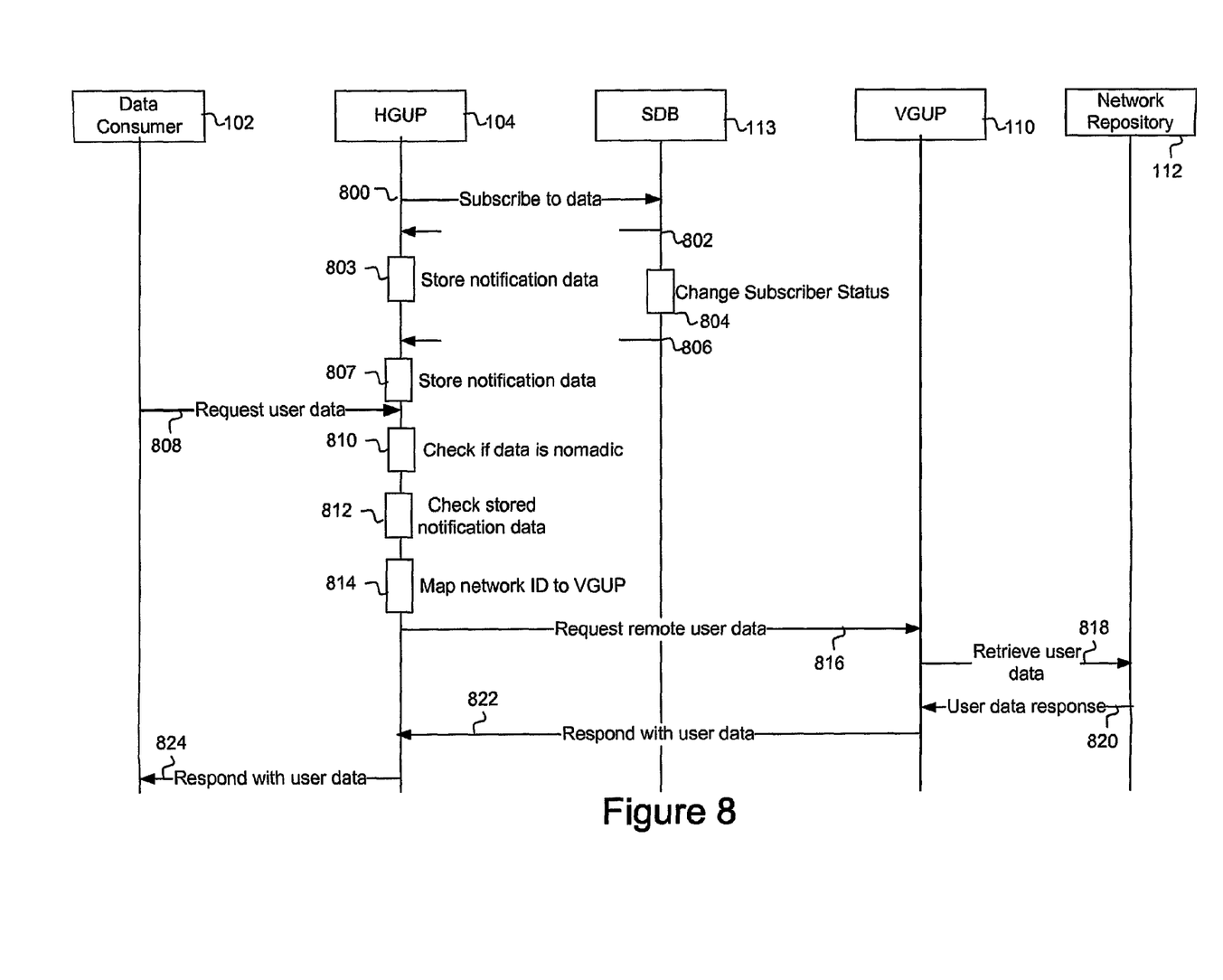
FIG. 8 is a message sequence chart showing a mechanism for IPF triggering according to an embodiment of the invention using notification of roaming status.

FIG. 8 is a message sequence chart showing a mechanism for IPF triggering according to an embodiment of the invention using notification of roaming status. Also in this embodiment, referring to FIGS. 1b and 1c, the user A is roaming at a location pos2 in the visited domain 109 here being PLMN2 152.

A generic subscription is performed by the GUP Server in step 800 to notifications on changes of the information elements which provide roaming information. This subscription can be an Rp SubscribeToData or an Sh-Subs-Notif(id) message. In step 802 a response is received by the HGUP. The subscription process takes place only once per subscriber. In step 803 such response is stored in the NDB 650. Subsequently, when the roaming status of a user changes, this is detected in a step 804, a notification to this effect is sent from the SDB in step 806 using an Rp NotifyData or Sh-Subs-Notif message and the result is stored/updated in the NDB in step 807. A data request about that user A is received in step 808 and will automatically trigger the IPF 501. In step 810 a check is made by the RVF whether the data is nomadic and can be located in another network, e.g. subject to roaming, and if confirmative the HGUP will check the NDB 650 in step 812 whether the user is actually roaming. If so, the PLMN-Id is mapped to a URL for the VGUP in question by the ULF 630 in step 814. In step 816 a query for user data is compiled by the MB 640 is sent to the identified VGUP over the Ri interface 111. In step 818 the VGUP will retrieve the requested user data from the Network Repository 112 using a ReadData message over the Rp interface. In step 820 the user data is responded back to the VGUP which will process and forward it to the HGUP in step 822. In step 824 the data is further forwarded to the requesting data consumer.

Figure 9:
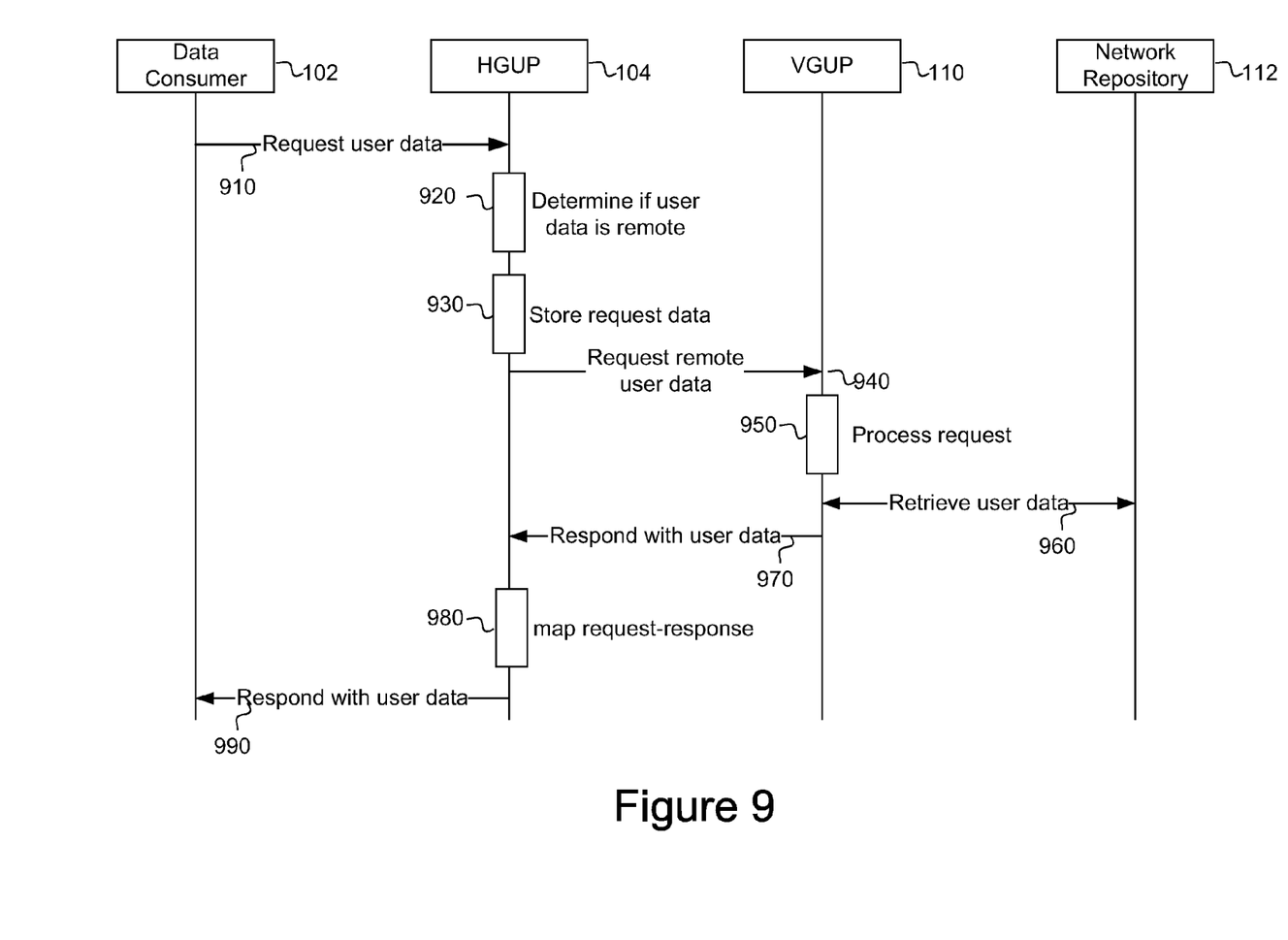
FIG. 9 is a message sequence chart showing an embodiment of the invention using stateful proxy functionality.

FIG. 9 is a message sequence chart describing an embodiment of the invention using a stateful proxy functionality.

In step 910 the HGUP receives a query from the application (data requestor).

In step 920, the HGUP achieves, by for example using any method previously described, the knowledge of the network the end-user is roaming in.

In step 930 the HGUP stores at least parts of the original query.

In step 940 the HGUP removes the information which identifies the data consumer as requestor of the data and insert instead HGUP's own application identifier (this assumes that the HGUP is allowed—i.e. a commercial relationship to query VGUP exists. Also the VGUP access point (i.e. URL) is changed and the mapping between the original query and the new one is stored. The modified request is then sent to the VGUP using the Rg interface or the Rp interface.

In step 950 the VGUP checks the identity of the data consumer, i.e. the HGUP, and will process the request if the requesting HGUP is one where an agreement exists. The VGUP fetches the requested data in step 960 and answers back to the requesting HGUP over the Rg interface or the Rp interface in step 970.

In step 980, on answer reception from VGUP, the HGUP maps the answer to the original query and answers back to the original application with the information provided by VGUP in step 990.

Figure 10:
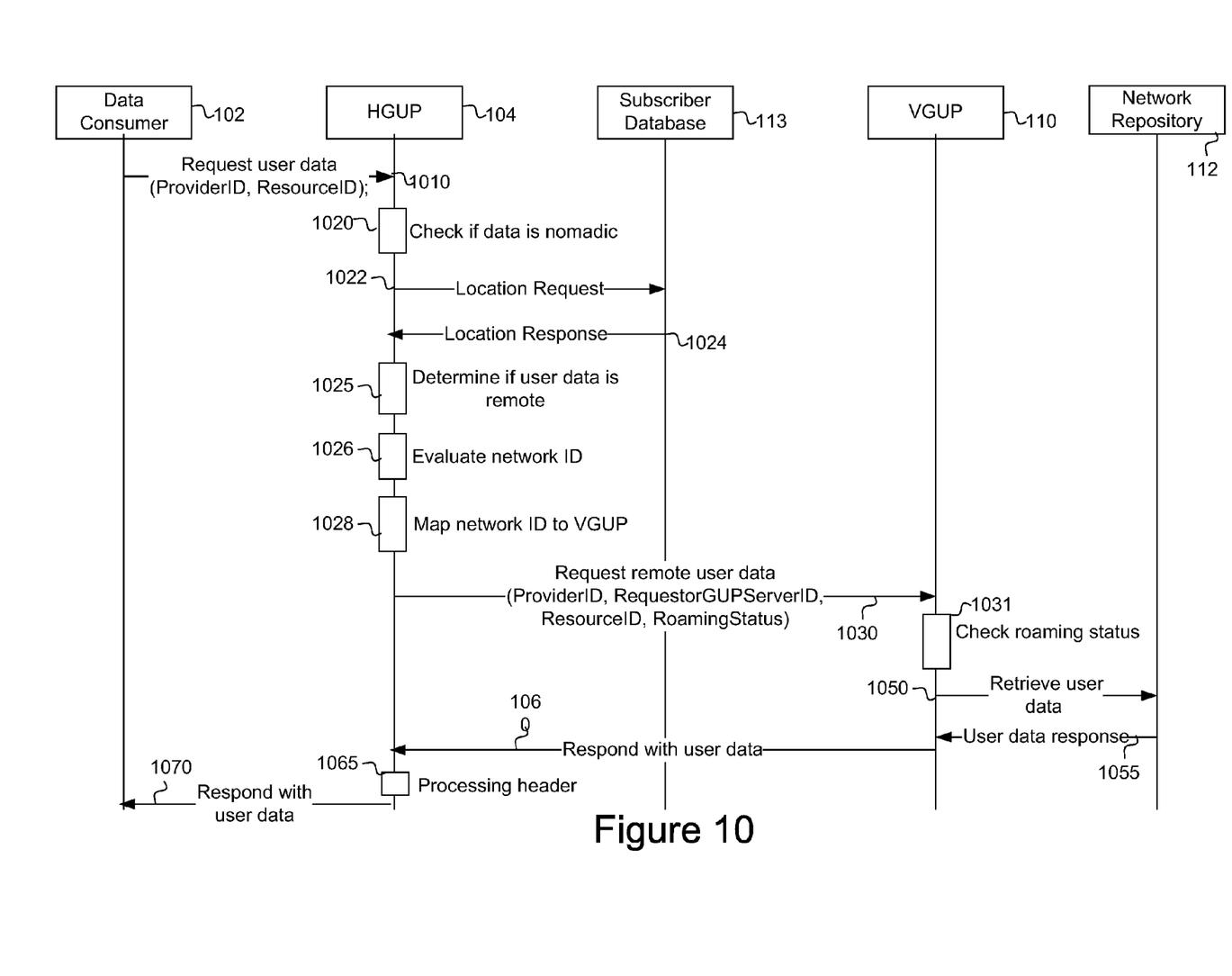
FIG. 10 is a message sequence chart showing an embodiment of the invention including protocol details.

FIG. 10 is a message sequence chart describing an embodiment of the invention in greater detail. Also in this embodiment, referring to FIGS. 1b and 1c, the user A is roaming at a location pos2 in the visited domain 109 here being PLMN2 152.

In step 1010 an application, i.e. data consumer 102, queries the GUP server HGUP 104 it has established a commercial relationship with. The query includes the identity of the end user which is user roaming@3gpp.org and the identity of the data consumer which is http://application.com.

Upon reception of the message the HGUP server will check in step 1020 if a requested portion of the user profile is nomadic and might be located in another domain. For that purpose it will use the RVF 620 within the IPF 501.

If the result of previous check is positive, i.e. the parameter is potentially subject to be retrieved from another network, a query to the SDB is performed in step 1022 in order to obtain the location of the user. This query can be done in different ways: using GUP's Rp interface or the existing Sh interface (HGUP behaving as an Application Server AS).

In step 1024 the SDB answers back to HGUP providing the SAI or other location information.

In step 1025 the HGUP determines based on the SAI information the domain (PLMN Id) the user is currently located in, which happens to be roaming in PLMN2.

In step 1026 the HGUP checks that the identified PLMN is one with which a valid roaming agreement exists.

After this, in step 1028 the HGUP uses the ULF 630 within IPF to map the PLMN-id to a valid VGUP URI where to send the query.

The HGUP, acting as a proxy, uses the Message Builder 640 within IPF in order to build a new query.

The query includes:

- The requestor data, i.e. http://application.com, which maps to the providerID attribute of the Liberty's DST protocol and identifies the application actually querying data.
- A RequestorGUPServerID attribute to be included in the Provider header as specified in Liberty DST. The RequestorGUPServerID identifies an intermediary system/proxy, i.e. the HGUP URI, acting on behalf of the original data requestor and which will place requests towards the VGUP.
- A Resource Identity, i.e. user roaming@3gpp.org which maps to the ResourceID attribute of the Liberty's DST protocol and identifies the end-user whose data is being queried.
- The roaming status of the end-user the query is based on. The Roaming status information element can be implemented either by modifying the current ResourceIDType type or by introducing a new RoamingStatus element as part of the QueryType in Liberty DST. The HGUP forwarding queries to visited domains will include this new attribute and will set the value according to the following rule: RoamingStatus="1" indicating that the end-user whose data is being queried is on roaming. VGUP server shall process the incoming query even though it refers to an end-user not of its own. RoamingStatus="0" indicating that the end-user belongs to the VGUP server. This also enables Mobile Virtual Network Operators (MVNOs) with its own GUP server deployed (acting as HGUP) to forward queries to the GUP server deployed by the network operator (acting as VGUP). In this use case the RoamingStatus attribute is set to "1" to indicate that the end-user whose data is being queried is on roaming.

The new query for remote user data is sent to the VGUP 110 over the Ri interface 111 in step 1030.

In step 1031 the VGUP receives the message and checks for presence of the RoamingStatus parameter for distinguishing how it must process the incoming query. Its presence indicates that although the query is relevant to an end-user which in principle does not belong to that network, the query must be processed due to a roaming situation. The VGUP also checks the RequestorGUPServerID in order to know to which URI the relevant response should be sent back.

In step 1050 the VGUP retrieves user data from the relevant network repository 112 using the GUP Rp interface 105.

In step 1055 the corresponding network repository replies back with the user data to VGUP.

VGUP answers back with the user data to the HGUP in step 1060, based on the information provided in the RequestorGUPServerID, with the relevant data.

In step 1065 the HGUP processes the response from the VGUP and deletes the RequestorGUPServerID and RoamingStatus from the message header.

In step 1070 the HGUP answers back to the data consumer 102 (i.e. application).

The invention claimed is:

1. A method for retrieving subscriber related data related to a subscriber, the method being performed in a communications network comprising in a first generic user profile (GUP) server performing on at least one processor the steps of:
    receiving an incoming request for subscriber related data from a data consumer in a first communication domain;
    determining that a portion of the subscriber related data is nomadic;
    obtaining a location of the subscriber;
    determining that at least a part of the subscriber related data is located in a second communication domain by retrieving an identification of a second communication domain;
    using the identification of the second communication domain to determine an address to a second GUP server;
    storing a mapping between the incoming request and an outgoing request including an identity of the first GUP server;
    transmitting the outgoing request to the second GUP server in the second communication domain for the at least part of the subscriber related data;
    receiving a response from the second GUP server containing the at least part of the subscriber related data;
    mapping the subscriber related data to the incoming request; and
    forwarding the subscriber related data to the data consumer.

2. A method according to claim 1 wherein the steps of transmitting the outgoing request to, and receiving the response from, the second GUP server occurs over a GUP server interworking interface.

3. A method according to claim 1 wherein the identification of the second communication domain is based on a service area identity stored in a subscriber database of the first communication domain.

4. A method according to claim 1 wherein before the step of determining performing the steps of:
    subscribing to notifications on changes of the identification of the second communication domain;
    receiving the notifications on the changes; and
    storing the notifications on the changes.

5. A method according to claim 1 wherein the subscriber related data comprises static data and dynamic data.

6. A method according to claim 1 wherein the step of transmitting the outgoing request to the second GUP server includes sending an identifier of the data consumer.

7. A method according to claim 1 wherein the step of transmitting the outgoing request to the second GUP server includes sending a roaming status indicator for indicating whether an end-user whose subscriber related data is being queried is roaming.

8. A method according to claim 1 wherein the step of transmitting the outgoing request to the second GUP server is performed over a 3GPP GUP Rg or a 3GPP GUP Rp or an interworking interface Ri.

9. A method according to claim 1 wherein the subscriber is roaming in a first network or a second network.

10. A method according to claim 1 wherein the subscriber is a subscriber of another communications network.

11. A home generic user profile (GUP) server for retrieving subscriber related data related to a subscriber comprising a processor and a memory having program code stored on a tangible and non-transitory computer readable medium and processable by the processor comprising:
    an interface for receiving an incoming request for subscriber related data from a data consumer in a first communication domain;
    the memory comprising an inter domain proxy function for receiving data requests on subscriber related data which belong to a subscriber, where the subscriber related data is currently handled by a GUP server in another communication domain than a communication domain of the GUP server of the data consumer for determining that at least a part of the subscriber related data is located in a second communication domain, wherein the inter domain proxy function further comprises:
    a remote data verification function for analyzing the data requests to determine if the subscriber related data can be located in another communication domain than the communication domain of the GUP server of the data consumer, the remote data verification function retrieving an identification of the second communication domain and a look up function mapping the identification of the second communication domain to a visited-GUP address;
    an interface for transmitting an outgoing request including an identity of the GUP server to a second GUP server in the second communication domain for the at least part of the subscriber related data, a mapping between the incoming request and the outgoing request being stored in the memory;
    an interface for receiving a response from the second GUP server containing at least part of the subscriber related data, the subscriber related data being mapped to the incoming request; and
    an interface for forwarding the subscriber related data to the data consumer.

12. The home GUP server according to claim 11 comprising a GUP server interworking interface for transmitting the outgoing request to, and receiving the response from, the second GUP server.

13. The home GUP server according to claim 11 wherein the remote data verification function comprises a notifications database for storing notifications of changes in user data location.

14. The home GUP server according to claim 11 wherein the inter domain proxy function comprises a repository for parameter storage and an address lookup function to map a domain identity parameter to a valid remote GUP address.

15. The home GUP server according to claim 11 wherein the subscriber is roaming in a first network or a second network.

* * * * *